CANFIELD, STILL & WHEELER.
Harvester.

No. 53,409. Patented March 27, 1866.

WITNESSES:
J. S. Shelden
David Shepard

INVENTOR.
James M. Canfield
A. S. Still
E. P. Wheeler
by Coburn & Thacher
attys

UNITED STATES PATENT OFFICE.

J. M. CANFIELD, A. T. STILL, AND E. P. WHEELER, OF LAWRENCE, KANSAS.

IMPROVEMENT IN HARVESTERS.

Specification forming part of Letters Patent No. 53,409, dated March 27, 1866.

*To all whom it may concern:*

Be it known that we, JAMES M. CANFIELD, A. T. STILL, and E. P. WHEELER, of Lawrence, in the county of Douglas and State of Kansas, have invented and discovered a new and useful Improvement in Harvesters; and we do hereby declare that the following is a full, clear, and exact description of the same, reference being had to the accompanying drawings, and the letters and figures marked thereon, which form part of this specification.

The nature of our said invention consists in the arrangement of a novel device at one end of the platform in the rear of the sickle upon which the grain falls, and along which it is carried by means of an endless apron, or other suitable device, and delivered upon said device arranged as aforesaid, and when enough grain has accumulated thereon to form a bundle it is readily tilted up or withdrawn, depositing the grain upon the ground ready for binding.

To enable those skilled in the art to understand how to construct and make use of our invention, we will proceed to describe the same with particularity, making reference in so doing to the aforesaid drawings, in which—

Figure 1:
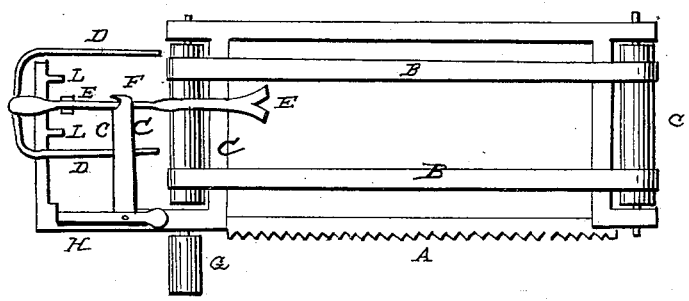
Figure 2:
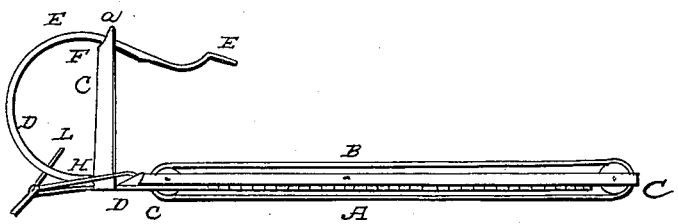

Figure 1 represents a plan or top view of our invention, and Fig. 2 a side view of the same.

Similar letters of reference in the different figures denote the same parts of our invention.

A represents the sickle; B, the endless apron upon which the grain falls, arranged upon the rollers C, to which motion may be communicated from the drive-wheel by means of a drum, G, or any other suitable arrangement of gearing.

D represents a cradle or receptacle for the grain, provided with any suitable number of fingers, as shown, and with the handle E arranged at the end of the platform and suspended at the point *a* upon the support F in such a manner that when at rest the receptacle lies ready to receive the grain from the endless apron, but when the handle E is depressed the fingers D recede from beneath the grain received thereon, and allow it to fall to the ground, said grain being forced or raked off from the ends of said fingers D by means of the rake-teeth L, arranged as shown for that purpose.

By means of the cord *b*, attached as shown to the handle E, passing through a suitable rest, *c*, and then going down to be attached to the foot-lever H, the above-described operation may be performed by pressing the foot upon the lever H, if desired.

Instead of an oscillating cradle or receptacle, as described, a reciprocating one may be employed, which slides horizontally from beneath the grain to discharge it when desired.

The fingers D are so supported at the point *a*, as aforesaid, that when no pressure is applied to handle E or lever H the apparatus assumes of its own accord the proper position to receive the grain, so that after discharging the grain which has accumulated thereon it returns to its position automatically.

It is obvious that the receptacle D, whether oscillating or reciprocating, may be operated by any other device than those herein shown and described.

Having described our invention, we will proceed to specify what we claim and desire to secure by Letters Patent:

The arrangement of the grain-receptacle D, the handle E, and standard F, when constructed and operated substantially as and for the purposes specified and shown.

J. M. CANFIELD.
      A. T. STILL.
      E. P. WHEELER.

In presence of—
 E. V. BANKS,
 GEO. A. BANKS.